(12) United States Patent
Wang

(10) Patent No.: US 12,160,798 B2
(45) Date of Patent: Dec. 3, 2024

(54) RESOURCE INDICATION METHOD AND DEVICE, AND COMMUNICATION APPARATUS

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 348 days.

(21) Appl. No.: 17/842,929

(22) Filed: Jun. 17, 2022

(65) Prior Publication Data

US 2022/0312157 A1    Sep. 29, 2022

Related U.S. Application Data

(63) Continuation of application No. PCT/CN2019/130117, filed on Dec. 30, 2019.

(51) Int. Cl.
| | |
|---|---|
| *H04W 4/06* | (2009.01) |
| *H04W 72/0446* | (2023.01) |
| *H04W 72/0453* | (2023.01) |
| *H04W 72/1263* | (2023.01) |
| *H04W 76/12* | (2018.01) |

(52) U.S. Cl.
CPC ......... *H04W 4/06* (2013.01); *H04W 72/0446* (2013.01); *H04W 72/0453* (2013.01); *H04W 72/1263* (2013.01); *H04W 76/12* (2018.02)

(58) Field of Classification Search
CPC ............... H04W 4/06; H04W 72/0446; H04W 72/0453; H04W 72/1263; H04W 76/12; H04W 76/40; H04W 72/27; H04W 72/30; H04W 80/02; H04W 48/12; H04W 52/02; Y02D 30/70
See application file for complete search history.

(56) References Cited

U.S. PATENT DOCUMENTS

| | | | |
|---|---|---|---|
| 8,224,343 B2 * | 7/2012 | Wang | H04L 1/1867 |
| | | | 455/452.2 |
| 10,917,202 B2 * | 2/2021 | Yi | H04L 1/1854 |

(Continued)

FOREIGN PATENT DOCUMENTS

| | | |
|---|---|---|
| CN | 101841769 A | 9/2010 |
| CN | 109151737 A | 1/2019 |

(Continued)

OTHER PUBLICATIONS

Huawei, "Discussion on prioritization for NR study and work phases", 3GPP TSG-RAN Meeting #73 RP-161722, New-Orleans, USA, Sep. 19-22, 2016.

(Continued)

*Primary Examiner* — Mohamed A Kamara
(74) *Attorney, Agent, or Firm* — PERKINS COIE LLP

(57) ABSTRACT

A resource indication method and device, and a communication apparatus are provided. The method comprises: a distributed unit (DU) receiving first indication information sent by a centralized unit (CU), the first indication information indicating a location of a radio resource for multimedia broadcast multicast service (MBMS) data.

18 Claims, 15 Drawing Sheets

(56) References Cited

U.S. PATENT DOCUMENTS

| | | | |
|---|---|---|---|
| 2011/0228746 A1* | 9/2011 | Chun | H04W 28/06 370/328 |
| 2018/0213439 A1* | 7/2018 | Uchino | H04L 1/1628 |
| 2019/0327665 A1 | 10/2019 | Geng et al. | |
| 2020/0120553 A1 | 4/2020 | Wang et al. | |
| 2022/0264572 A1* | 8/2022 | Li | H04W 56/0015 |

FOREIGN PATENT DOCUMENTS

| | | |
|---|---|---|
| CN | 109152086 A | 1/2019 |
| WO | 2019185014 A1 | 10/2019 |

OTHER PUBLICATIONS

International Search Report in the international application No. PCT/CN2019/130117, mailed on Oct. 9, 2020.
Written Opinion of the International Search Authority in the international application No. PCT/CN2019/130117, mailed on Oct. 10, 2020.
David Vargas et al: "RAN Logical Architecture and Interfaces for 5G-Xcast", Feb. 28, 2019, 95 pages. * p. 7-p. 9* paragraph [0017]-paragraph [0023]* * p. 29-p. 32 *.
Supplementary European Search Report in the European application No. 19958431.9, mailed on Nov. 24, 2022. 9 pages.

* cited by examiner

| D/C | PDU type | R | R | R | R |
|---|---|---|---|---|---|
| Resource indication information ||||||
| ... ... ... ||||||
| Resource indication information ||||||

FIG. 10

RESOURCE INDICATION METHOD AND DEVICE, AND COMMUNICATION APPARATUS

CROSS-REFERENCE TO RELATED APPLICATION

This is a continuation application of International Patent Application No. PCT/CN2019/130117, filed on Dec. 30, 2019, the content of which is hereby incorporated by reference in its entirely.

BACKGROUND

Multimedia Broadcast Multicast Service (MBMS) is a technology that transmits data from one data source to multiple users by sharing network resources. This technology can effectively utilize the network resources to realize broadcast and multicast of a multimedia service at a high rate (e.g. 256 kbps) while providing the multimedia service.

In a New Radio (NR) system, many scenarios need to support service requirements of multicast and broadcast, for example, in the Internet of Vehicles and the Industrial Internet. Therefore, it is necessary to introduce the MBMS into the NR. The performance of a cell edge is generally poor for the MBMS service, so if synchronously content transmissions between cells are realized, a terminal device can receive the same data from two cells at the same time at the cell edge, thereby improving the reliability of data transmission by merging gains. However, how to achieve the synchronously content transmissions between two adjacent cells is a problem.

SUMMARY

Embodiments of the disclosure relate to the technical field of mobile communication, and more particularly to a method and device for resource indication, and a communication apparatus.

The embodiments of the disclosure provide a resource indication method and device, and a communication apparatus.

The resource indication method is provided by the embodiments of the disclosure, which includes the following operation.

A Distributed Unit (DU) receives first indication information from a Centralized Unit (CU). The first indication information is used for indicating a location of a radio resource for MBMS service data.

The resource indication method is provided by the embodiments of the disclosure, which includes the following operation.

The CU sends the first indication information to at least one DU. The first indication information is used for indicating the location of the radio resource for the MBMS service data.

The resource indication device is provided by the embodiments of the disclosure, which is applied to the DU, and includes a receiving unit.

The receiving unit is configured to receive the first indication information from the CU. The first indication information is used for indicating the location of the radio resource for the MBMS service data.

The resource indication apparatus provided by the embodiments of the disclosure is applied to the CU, and may include a sending unit.

The sending unit is configured to send the first indication information to at least one DU. The first indication information is used for indicating the location of the radio resource for the MBMS service data.

The communication apparatus is provided by the embodiments of the disclosure, which may include a processor and a memory. The memory is arranged to store a computer program. The processor is arranged to call and run the computer program stored in the memory to execute the resource indication method.

A chip is provided by the embodiments of the disclosure, which is arranged to implement the resource indication method.

Specifically, the chip may include a processor, which is arranged to call and run the computer program in the memory to enable a device equipped with the chip to execute the resource indication method.

A computer-readable storage medium is provided by the embodiments of the disclosure, which is arranged to store a computer program which enables a computer to execute the resource indication method.

A computer program product is provided by the embodiments of the disclosure, which may include a computer program instruction which enables a computer to execute the resource indication method.

A computer program is provided by the embodiments of the disclosure, when running in a computer, a computer program enables the computer to execute the resource indication method.

Through the above technical solutions, the CU configures for at least one DU the location of the radio resource for the MBMS service data through the first indication information, so that at least one DU may send the same MBMS service data at the same location of the radio resource indicated by the first indication information. Because different cells are covered by different DUs, the synchronous transmission of contents between the cells is realized when MBMS service transmission is supported in the NR system, which improves the transmission reliability of the MBMS service data at the cell edge.

BRIEF DESCRIPTION OF THE DRAWINGS

The accompanying drawings described herein are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings:

FIG. 10 is a structure diagram of a Packet Data. Convergence Protocol (PDCP) control Packet Data Unit (PDU) according to an embodiment of the disclosure;

DETAILED DESCRIPTION

The technical solutions in the embodiments of the present disclosure will be described below in combination with the drawings in the embodiments of the present disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Long Term Evolution (LTE) system, an LTE Frequency Division Duplex (FDD) system, an LTE Time Division Duplex (TDD) system, a 5th Generation (5G) communication system or a future communication system, etc.

Figure 1:
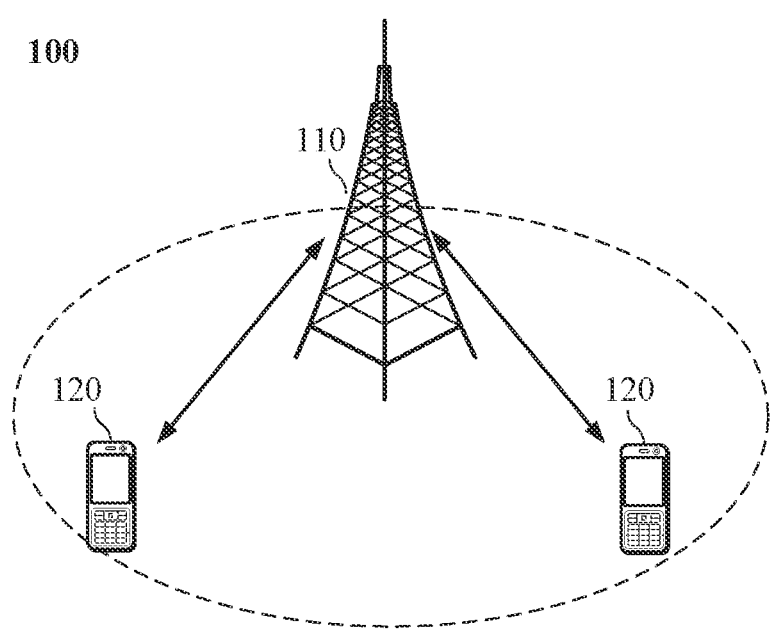
FIG. 1 is a schematic diagram of a communication system architecture according to an embodiment of the disclosure.

Exemplarily, a communication system 100 applied to the embodiments of the disclosure is illustrated in FIG. 1. The communication system 100 may include a network device 110, and the network device 110 may be a device communicating with a terminal 120 (or called a communication terminal and a terminal device). The network device 110 may provide communication coverage for a specific geographical region and may communicate with terminals located in the coverage. Optionally, the network device 110 may be an Evolutional Node B (eNB or eNodeB) in the LTE system, or a wireless controller in a Cloud Radio Access Network (CRAN). Or the network device may be a mobile switching center, a relay station, an access point, a vehicle device, a wearable device, a hub, a switch, a network bridge, a router, a network-side device in a 5G network or a network device in a future communication system, etc.

The communication system 100 further includes at least one terminal 120 within the coverage of the network device 110. The "terminal" used herein includes, but not limited to: a device connected through a wired line connection, for example, through Public Switched Telephone Network (PSTN), Digital Subscriber Line (DSL), digital cable and direct cable connections; and/or another data connection/network; and/or a wireless interface, for example, for a cellular network, a Wireless Local Area Network (WLAN), a digital television network like a Digital Video Broadcasting-Handheld (DVB-H) network, a satellite network and an Amplitude Modulated-Frequency Modulated (AM-FM) broadcast transmitter; and/or a device of another terminal configured to receive/send communication signals, and/or an Internet of Things (IoT) device. The terminal configured to communicate through a wireless interface may be called a "wireless communication terminal", a "wireless terminal" or a "mobile terminal." Examples of the mobile terminal include, but not limited to: a satellite or cellular telephone; a Personal Communication System (PCS) terminal capable of combining a cellular radio telephone and data processing, faxing and data communication capabilities; a Personal Digital Assistant (PDA) capable of including a radio telephone, a pager, Internet/intranet access, a Web browser, a notepad, a calendar and/or a Global Positioning System (GPS) receiver: and a conventional laptop and/or palmtop receiver or another electronic device including a radio telephone transceiver. The terminal may refer to an access terminal, User Equipment (UE), a subscriber unit, a subscriber station, a mobile radio station, a mobile station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal in the 5G network, a terminal in the future evolved Public Land Mobile Network (PLMN) or the like.

Optionally, Device to Device (D2D) communication may be performed between the terminals 120.

Optionally, the 5G communication system or the 5G network may also be called an NR system or an NR network.

A network device and two terminals are exemplarily illustrated in FIG. 1. Optionally, the communication system 100 may include multiple network devices and another number of terminals may be included in coverage of each network device. There are no limits made thereto in the embodiments of the disclosure.

Optionally, the communication system 100 may further include another network entity such as a network controller and a Mobility Management Entity (MME), etc. No limits are made thereto in the embodiments of the disclosure.

It is to be understood that a device with a communication function in the network/system in the embodiments of the disclosure may be called a communication device. Taking the communication system 100 illustrated in FIG. 1 as an example, communication devices may include the network device 110 and terminal 120 which have the communication function, and the network device 110 and the terminal 120 may be the specific devices mentioned above and will not be elaborated herein. The communication devices may further include other devices in the communication system 100, for example, other network entities such as a network controller and an MME, etc. There are no limits made thereto in the embodiments of the disclosure.

It is to be understood that terms "system" and "network" used herein may usually be exchanged. Herein, term "and/or" is only an association relationship describing associated objects and represents that three exists relationships. For example, A and/or B may represent three conditions: independent existence of A, existence of both A and B and independent existence of B. In addition, character "/" used herein usually represents that the associated objects before and after form an "or" relationship.

For the convenience of understanding the technical solutions in the embodiments of the disclosure, the relevant technological solutions of the embodiments of the disclosure are described below.

With the people's pursuit of speed, delay, high-speed mobility and energy efficiency, as well as the diversity and complexity of services in future life, the 3rd Generation Partnership Project (3GPP) International Standards Organization begins to develop 5G. The main application scenarios of 5G are as follows: enhanced Mobile Broadband eMBB), Ultra-Reliable Low-Latency Communications (URLLC), and massive Machine-Type Communications (mMTC).

On one hand, eMBB still aims to enable users to obtain a multimedia content, service and data, and requirements thereof increase rapidly. On the other hand, since eMBB may be deployed in different scenarios, for example, a room, an urban area and a rural area, etc, and capabilities and requirements of eMBB are also greatly different, which cannot be generalized, and it is necessary to analyze in combination with a specific deployment scenario. Typical applications of URLLC include industrial automation, power automation, remote medical operation (surgery), traffic safety guarantee and the like. Typical features of mMTC include: high connection density, small data volume, delay-insensitive services, low cost and long service life of modules and the like.

During early deployment of NR, it is difficult to obtain full NR coverage, so typical network coverage is a mode of wide-area LTE coverage and island coverage of NR. Besides, a lot of LTE is deployed below 6 GHz, and there are few spectra below 6 GHz available for 5G. Therefore, spectrum application above 6 GHz in NR must be studied, while the coverage of high frequency band is limited and the signal fading is fast. At the same time, in order to protect mobile operators' early investment in LTE, a working mode of tight interworking between LTE and NR is proposed.

Radio Resource Control (RRC) State

In 5G, a new RRC state (namely an RRC_INACTIVE state) is defined for the purpose of reducing air interface signaling, and quickly resuming wireless connection and data service. This state is different from an RRC_IDLE state and an RRC_ACTIVE state.

1) RRC_IDLE state (called idle state for short): mobility is UE-based re-selection of cell selection, paging is initiated by a Core Network (CN), and a paging area is configured by the CN. There is no UE context and no RRC connection on a base station side.

2) RRC_CONNECTED state (called connected state for short): there is the RRC connection, and there is the UE context on the base station side and the UE side. The network side knows that the location of the UE is a specific cell level. The mobility is controlled by the network side. Unicast data may be transmitted between the UE and the base station.

3) RRC_INACTIVE state (called inactive state for short): the mobility is UE-based re-selection of cell selection, there is a connection between CN and NR, the UE context exists on a certain base station, the paging is triggered by RAN, an RAN-based paging area is managed by the RAN, and the network side knows that the location of the UE is an RAN-based paging area level.

Beam Sweeping

Figure 2:
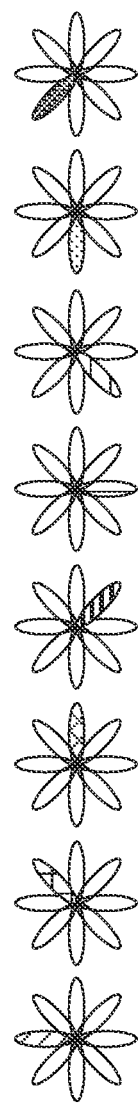
FIG. 2 is a schematic diagram of beam sweeping according to an embodiment of the disclosure.
Figure 3:
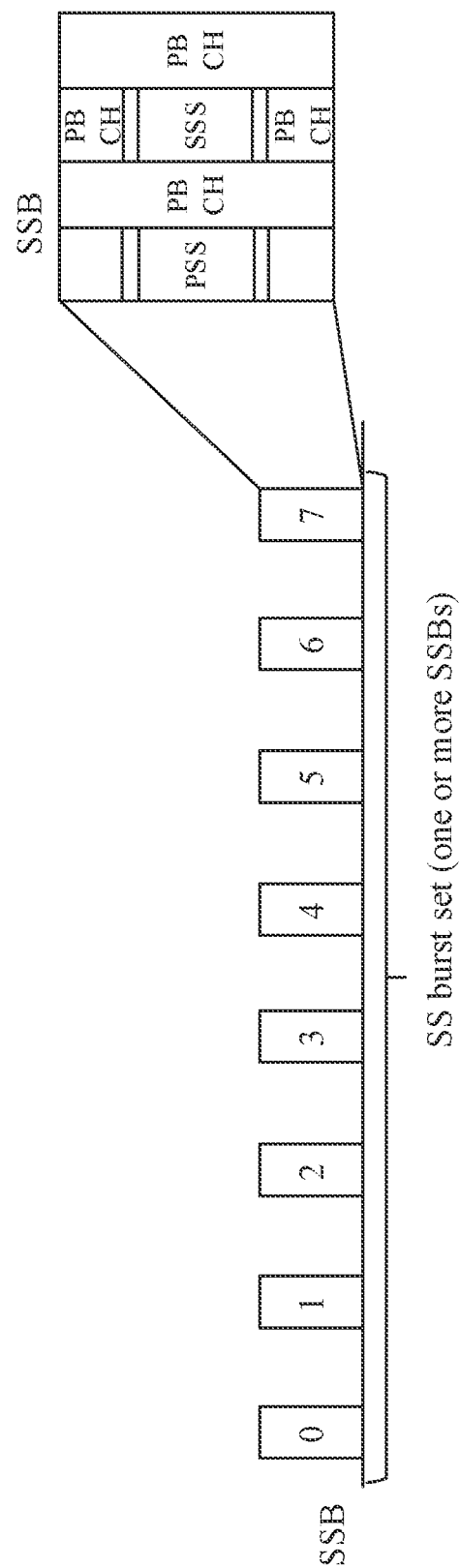
FIG. 3 is a schematic diagram of a Synchronization Signal Block (SSB) according to an embodiment of the disclosure.
Figure 4:
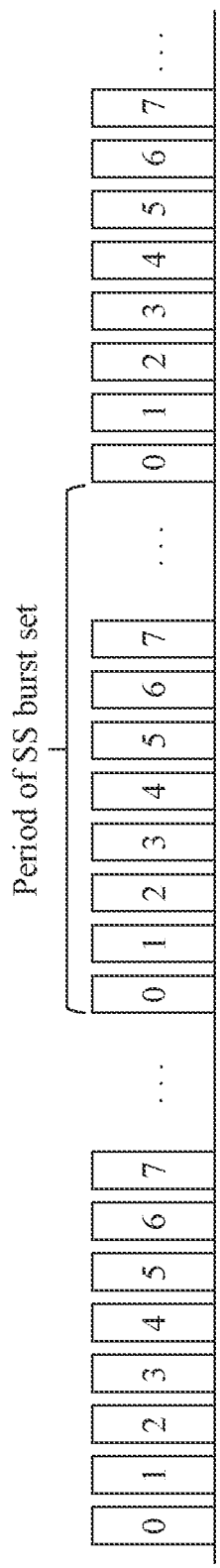
FIG. 4 is a schematic diagram of a period of a Synchronization Signal (SS) burst set according to an embodiment of the disclosure.

NR will be deployed on high frequencies in the future. In order to improve coverage, in 5G, beam sweeping mechanism is introduced to meet the coverage requirements (space for coverage, time for space), as illustrated in FIG. 2. After beam sweeping is introduced, it is necessary to send synchronization signals in each beam direction. The synchronization signal of 5G is given in the form of SS/PBCH block (SSB), including a Primary Synchronization Signal (PSS), a Secondary Synchronization Signal (SSS) and a Physical Broadcast Channel (PBCH), as illustrated in FIG. 3. The synchronization signal of 5G appears periodically in the time domain in the form of an SS burst set, as illustrated in FIG. 4.

The number of beams actually transmitted in each cell is determined by a configuration of network side, but a frequency point where the cell is located determines the maximum number of beams that can be configured, as illustrated in the following Table 1.

TABLE 1

| Frequency range | L (maximum number of beams) |
| --- | --- |
| up to 3(2.4) GHz | 4 |
| 3(2.4) GHz to 6 GHz | 8 |
| 6 GHz to 52.6 GHz | 64 |

Bandwidth Part (MVP)

The maximum channel bandwidth in 5G may be 400 MHz (i.e., broadband), which is very large compared with the maximum channel bandwidth 20 MHz in LTE. If the UE keeps working on a broadband carrier (i.e., the maximum channel bandwidth), the power consumption of the UE is high. Therefore, it is suggested that the radio frequency bandwidth of the UE may be adjusted according to the actual throughput of the UE. For this reason, a concept of BWP is introduced to optimize the power consumption of the UE. For example, if the UE has a low rate requirement, the UE may be configured with a smaller bandwidth (i.e., a BWP with a smaller bandwidth); if the UE has a high rate requirement, the UE may be configured with a larger bandwidth (i.e. a BWP with a larger bandwidth). If the UE supports a high rate or operates in a Carrier Aggregation (CA) mode, multiple BWPs may be configured for the UE. In addition, another purpose of BWP is to trigger the coexistence of multiple numerologies in a cell, for example, BWP1 corresponds to numerology 1, and BWP2 corresponds to numerology 2.

The UE in the idle state or inactive state camps on the initial BWP, the initial BWP is visible to the UE in the idle state or inactive state. The UE may obtain, on the initial BWP, a Master Information Block (MIB), Remaining Minimum System Information (RMSI), Other System Information (OSI) and paging information, etc.

MBMS

MBMS is introduced in the 3GPP Release 6 (R6). MBMS is a technology that transmits data from one data source to multiple UEs by sharing network resources. This technology can effectively utilize the network resources to realize broadcast and multicast of a multimedia service at a high rate (e.g. 256 kbps) while providing the multimedia service.

Due to the low spectrum efficiency of MBMS in 3GPP R6, it is not enough to carry and support the operation of mobile television type services effectively. Therefore, in LTE, the 3GPP clearly proposes to enhance the support capability for downlink high-speed MBMS services, and determines design requirements for a physical layer and an air interface.

The 3GPP Release 9 (R9) introduces evolved MBMS (eMBMS) into LTE. The eMBMS proposes a concept of Single Frequency Network (SFN), that is, Multimedia Broadcast multicast service Single Frequency Network (MBSFN). The MBSFN uses a uniform frequency to send service data in all cells at the same time, but it is necessary to ensure synchronization among the cells. This way may greatly improve the overall signal-to-noise ratio distribution of a cell, and the spectrum efficiency will be greatly improved accordingly. The eMBMS implements broadcast and multicast of services based on IP multicast protocol.

In LTE or LTE-Advanced (LTE-A), the MBMS has only a broadcast bearing mode, but no multicast hearing mode. In addition, receiving of MBMS service is applicable to the UE in the idle state or in the connected state.

A concept of Single Cell. Point To Multipoint (SC-PTM) is introduced in the 3GPP Release 13 (R13). The SC-PTM is based on an MBMS network architecture.

The MBMS introduces new logical channels, including a Single Cell-Multicast Control Channel (SC-MCCH) and a Single Cell-Multicast Transport Channel (SC-MTCH). The SC-MCCH and the SC-MTCH are mapped to a Downlink-Shared Channel (DL-SCH). Further, the DL-SCH is mapped to a Physical Downlink Shared Channel (PDCCH). The SC-MCCH and the SC-MTCH belong to the logical channels, the DL-SCH belongs to the transport channel, and the PDSCH belongs to the physical channels. The SC-MCCH and the SC-MTCH do not support Hybrid Automatic Repeat Request (HARQ) operations.

The MBMS introduces a new SIB type, that is, SIB20. Specifically, the transmission of configuration information of the SC-MCCH is performed through the SIB20, and there is only one SC-MCCH in a cell. The configuration information of the SC-MCCH includes a modification period of the SC-MCCH, a repetition period of the SC-MCCH, a radio frame and subframe for scheduling the SC-MCCH and the like. Further, 1) the boundary of the modification period of the SC-MCCH meets: SFN mod m=0, where SFN represents the system frame number of the boundary, and m is the modification period (i.e., sc-mcch-ModificationPeriod) of the SC-MCCH configured in the SIB20; 2) the radio frame for scheduling the SC-MCCH meets: SFN mod mcch-RepetitionPeriod=mcch-Offset, where SFN represents the system frame number of the radio frame, mcch-RepetitionPeriod represents the repetition period of the SC-MCCH, and mcch-Offset represents an offset of the SC-MCCH; 3) the subframe for scheduling the SC-MCCH is indicated by sc-mcch-Subframe.

The SC-MCCH is scheduled through a Physical Downlink Control Channel (PDCCH), On one hand, a new Radio Network Temporary Identity (RNTI) (namely a Single Cell RNTI (SC-RNTI)) is introduced to identify the PDCCH (e.g. SC-MCCH PDCCH) for scheduling the SC-MCCH. Optionally, the fixed value of the SC-RNTI is FFFC. On the other hand, a new RNTI (namely a Single Cell Notification RNTI (SC-N-RNTI)) is introduced to identify the PDCCH (e.g. notification PDCCH) for indicating a change notification of the SC-MCCH. Optionally, the fixed value of the SC-N-RNTI is FFFB. Further, the change notification may be indicated by one of eight bits of Downlink Control Information (DCI) IC. In LTE, the configuration information of the SC-PTM is based on the SC-MCCH configured in the SIB20, and then the SC-MCCH configures the SC-MTCH which is used for a transmission of service data.

Specifically, the SC-MCCH transmits only one message (namely SCPTMConfiguration), this message is used for configuring the configuration information of the SC-PTM. The configuration information of the SC-PTM includes a Temporary Mobile Group Identity (TMGI), a session id, a Group RNTI (G-RNTI), Discontinuous Reception (DRX) configuration information, SC-PTM service information of a neighbor cell, and so on. It is to be noted that the SC-PTM in the R13 does not support a Robust Header Compression (ROHC) function.

The downlink discontinuous reception of the SC-PTM is controlled by the following parameters: onDurationTimerSCPTM, drx-InactivityTimerSCPTM, SC-MTCH-SchedulingCycle and SC-MTCH-SchedulingOffset.

When "[(SFN*10)+subframe number] modulo (SC-MTCH-SchedulingCycle)=SC-MTCH-SchedulingOffset" is met, a timer onDurationTimerSCPTM is started.

When downlink PDCCH scheduling is received, a timer drx-InactivityTimerSCPTM is started.

A downlink SC-PTM service is received only when the timer onDurationTimerSCPTM or drx-InactivityTimerSCPTM is running.

SC-PTM service continuity adopts an MBMS service continuity concept based on SIB15, that is, a mode of "SIB15+MBMSInterestIndication". The service continuity of the UE in the idle state is based on a concept of frequency priority.

In NR, many scenarios need to support service requirements of multicast and broadcast, for example, in the Internet of Vehicles and the Industrial Internet, etc. Therefore, it is necessary to introduce MBMS into NR. However, since the transmission of MBMS service cannot achieve the reliability of data transmission by changing transmitted scheduling information according to the channel environment of a specific terminal device, for example, changing a TB size or MCS, etc, the performance of a cell edge is generally poor for the MBMS. If synchronously content transmissions between cells are realized (adjacent cells send the same data on the same time-frequency resource), a terminal device can receive the same data from two cells at the same time at the cell edge, thereby improving the reliability of data transmission by merging gains. However, how to achieve the synchronously content transmission between adjacent cells needs to be clarified. For this purpose, the following technical solutions of the embodiments of the disclosure are proposed.

Figure 5:
FIG. 5 is a schematic diagram of related configurations of a first System Information Block (SIB) according to an embodiment of the disclosure.

In the technical solutions of the embodiments of the disclosure, a new SIB (called the first SIB) is defined. With reference to FIG. 5, the first SIB includes the configuration information of a first Multicast Control Channel (MCCH). Herein, the first MCCH is a control channel for the MBMS service. In other words, the first SIB is used for configuring the configuration information of the control channel for the NR MBMS. Optionally, the control channel for the NR MBMS may also be called NR MCCH (i.e. the first MCCH).

Further, the first MCCH is used for carrying first signaling. The embodiments of the disclosure do not limit the name of the first signaling, for example, the first signaling is signaling A, and the first signaling includes the configuration information of at least one first Multicast Transport Channel (MTCH). Herein, the first MTCH is a service channel (also called data channel or transmission channel) for the MBMS service, and the first MTCH is used for transmitting MBMS service data (such as service data of the NR MBMS). In other words, the first MCCH is used for configuring the configuration information of the service channel for the NR MBMS. Optionally, the service channel for the NR MBMS may also be called NR MTCH (i.e. the first MTCH).

Specifically, the first signaling is used for configuring a service channel for the NR MBMS, service information corresponding to the service channel, and scheduling information corresponding to the service channel. Further, optionally, the service information corresponding to the service channel is identification information for identifying services, for example, TMGI, session id, etc. The scheduling information corresponding to the service channel is the RNTI used when the MBMS service data corresponding to the service channel is scheduled, such as G-RNTI and DRX configuration information, etc.

It is to be noted that the transmission of both the first MCCH and the first MTCH is scheduled based on the PDCCH. The RNTI used by the PDCCH for scheduling the first MCCH uses a unique identifier (i.e., a fixed value) of the whole network. The RNTI used by the PDCCH for scheduling the first MTCH is configured through the first MCCH.

Figure 6:
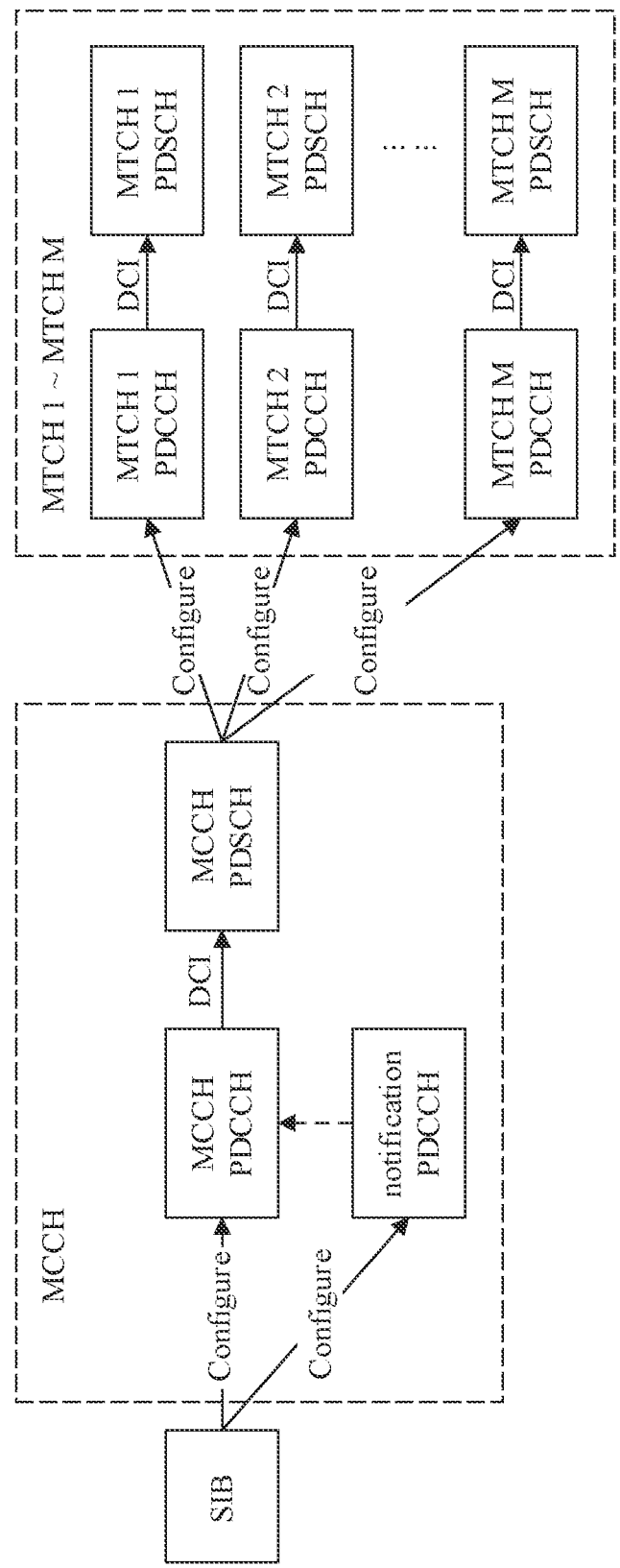
FIG. 6 is a schematic diagram of a configuration transmission mechanism of Point To Multipoint (PTM) according to an embodiment of the disclosure.
Figure 7:
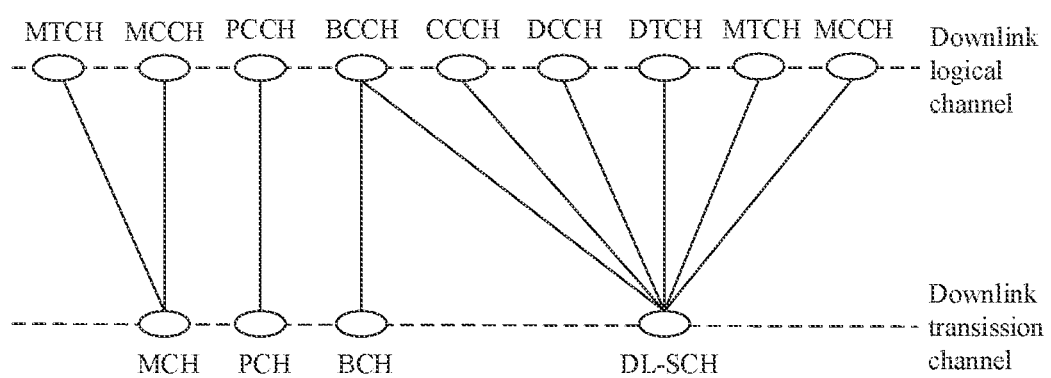
FIG. 7 is a PTM channel and a map of the PTM channel according to an embodiment of the disclosure.

It is to be noted that the embodiments of the disclosure do not limit the name of the first SIB, the first MCCH and the first MTCH. For the convenience of description, the first SIB may also be called SIB for short, the first MCCH may also be called MCCH for short, and the first MTCH may also be called MTCH for short. With reference to FIG. 6, the PDCCH for scheduling the MCCH (i.e. MCCH PDCCH) and the notification PDCCH are configured through the SIB, and the PDSCH (i.e. MCCH PDSCH) for transmitting the MCCH is scheduled through the DCI carried by the MCCH PDCCH. Further, M PDCCHs (i.e., MTCH 1 PDCCH, MTCH 2 PDCCH, . . . , MTCH M PDCCH) for scheduling the MTCH are configured through the MCCH. The PDSCH (i.e. MTCH n PDSCH) for transmitting the MTCH n is scheduled through the DCI carried by the MTCH n PDCCH, where n is an integer greater than or equal to 1 and less than or equal to M. With reference to FIG. 7, the MCCH and the MTCH are mapped to the DL-SCH. Further, the DL-SCH is mapped to the PDSCH. The MCCH and the MTCH belong to the logical channels, the DL-SCH belongs to the transmission channel, and the PDSCH belongs to the physical channel.

In the technical solutions of the embodiments of the disclosure, a network device pre-configures the radio resource (e.g. configured grant or pre-configured grant) for transmitting the MBMS service through a system broadcast message or the MCCH. Here, the system broadcast message is, for example, the first SIB in the above solution, and the MCCH is, for example, the first MCCH in the above solution.

Herein, a network side adopts an architecture where a CU and a DU are separated, the architecture can be considered that a network device includes a CU and at least one DU. In this case, the pre-configured radio resources are sent from the CU to the at least one DU. It is to be noted that, in the case of multiple DUs, the pre-configured radio resources sent from the CU to multiple DUs are identical.

Figure 8:
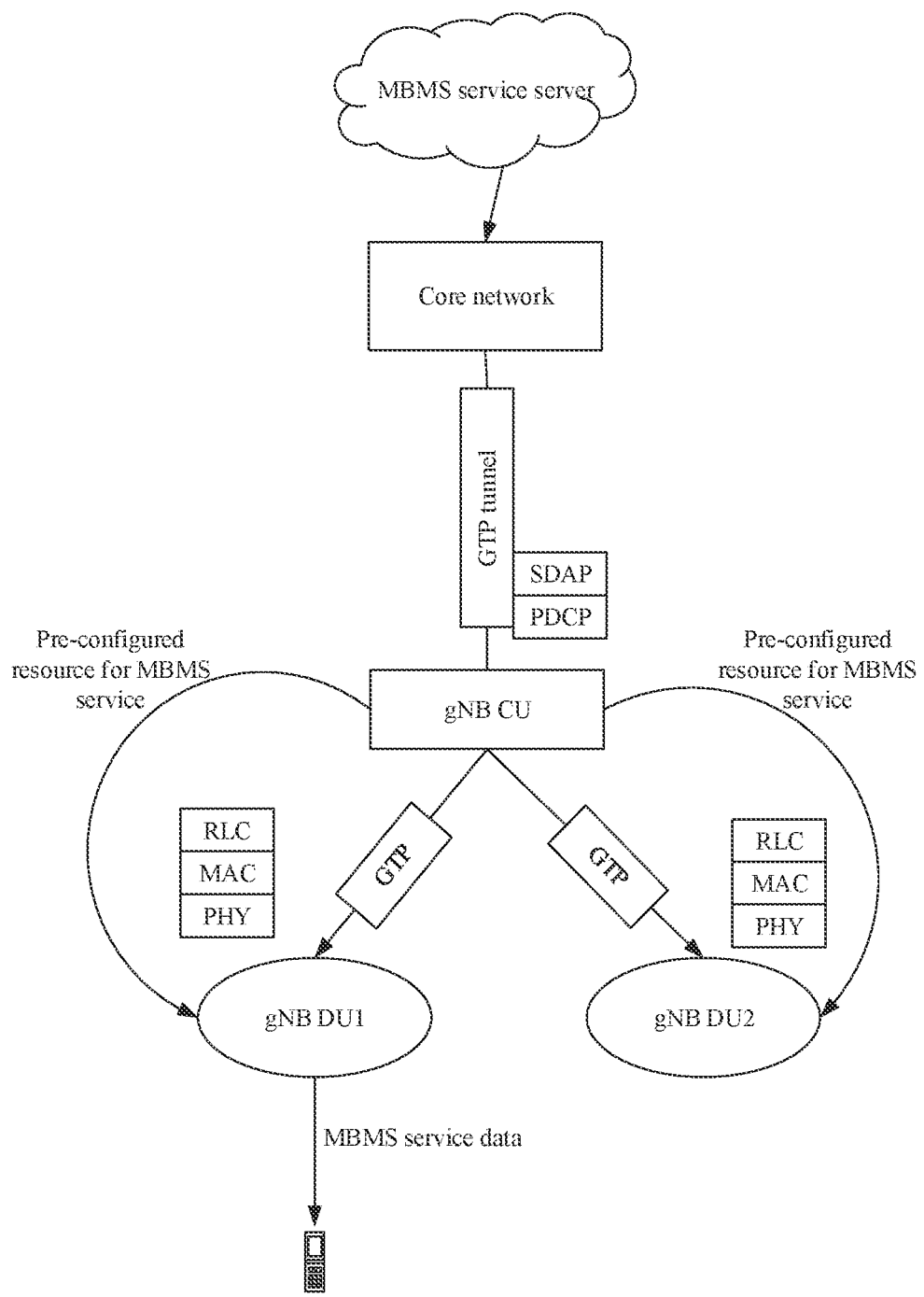
FIG. 8 is a network architecture diagram according to an embodiment of the disclosure.

With reference to FIG. 8, the pre-configured radio resources (such as configured grant or pre-configured grant) are sent from a gNB CU to a gNB DU through an F1 interface. Here, the F1 interface is an interface between the gNB CU and the gNB DU.

In the embodiments of the disclosure, the radio resources pre-configured for the MBMS service are periodically distributed in a certain time range and/or spectrum range, and MBMS radio resources are numbered (i.e. indexes of the MBMS radio resources) according to certain rules. It is to be noted that the MBMS radio resource may also be called MBMS occasion. An MBMS occasion may include several symbols or time slots.

In the architecture where a CU and a DC are separated, a Service Data Adaptation Protocol (SDAP) layer and a PDCP layer are at the CU side, and only a Radio Link Control (RLC) layer, a Media Access Control (MAC) layer and a Physical (PHY) layer (namely an L2 protocol stack) are at the DU side. As illustrated in FIG. 8, for the downlink, the CU receives the MBMS service data from the CN, encapsulates the MBMS service data, and sends a PDCP PDU carrying the MBMS service data to the DU, and the DU processes the PDCP PDU and sends the processed PDCP PDU. Different DUs may cover different cells. Generally, cells covered by the multiple DUs and belonging to the same CU are adjacent cells. Content synchronization between the adjacent cells may be achieved by adopting the DU sending resource indication information (i.e. the first indication information) to at least one CU associated with DU, as described below.

Figure 9:
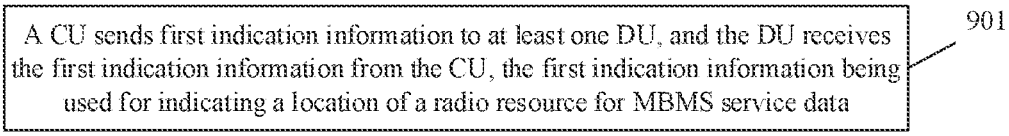
FIG. 9 is a flowchart of a resource indication method according to an embodiment of the disclosure.

FIG. 9 is a flowchart of a resource indication method according to an embodiment of the disclosure. As illustrated in FIG. 9, the resource indication method includes the following operations.

At operation 901, a CU sends first indication information to at least one DU, and the DU receives the first indication information from the CU, the first indication information is used for indicating a location of a radio resource for MBMS service data.

In the embodiments of the present disclosure, the network side adopts an architecture where a CU and a DU are separated. The CU and the DU are both entities on the base station side. One CU may be associated with one or more DUs. The protocol stack that the CU is responsible for includes: the SDAP layer and the PDCP layer. The protocol stack that the DU is responsible for includes: the RLC layer, the MAC layer and the PHY layer.

In an optional implementation, the base station is gNB, correspondingly, the CU may also be called gNB CU, and the DU may also be called gNB DU. As illustrated in FIG. 8, the MBMS service data between the gNB CU and the CN side is transmitted through a General Packet Radio Service (GPRS) Tunneling Protocol (GTP) tunnel. The MBMS service data between the gNB CU and the gNB DU1 and between the gNB CU and the gNB DU2 are also transmitted through the GTP tunnel. The DU1 and the DU2 send the MBMS service data, to enable the terminal device to receive the MBMS service data.

It is to be noted that different DUs may cover different cells. Generally, cells covered by the multiple DU and belonging to the same CU are adjacent cells. Multiple CUs send the same MBMS service data at the same location of the radio resource based on the first indication information, so as to achieve the content synchronization between the cells. The first indication information may be implemented in the following manners.

First Manner

The first indication information is used for indicating a location of a radio resource for a PDCP data PDU, and the PDCP data PDU is used for carrying the MBMS service data.

Based on this, a PDCP control PDU is defined, the first indication information is carried in the PDCP control PDU, and the PDCP control PDU and the PDCP data PDU are sent together to the DU by the CU. Herein, the PDCP data PDU refers to the PDCP PDU for the MBMS service data, that is, the PDCP data PDU is used for carrying the MBMS service data. With reference to FIG. 10, the PDCP control PDU carries the resource indication information (i.e. the first indication information).

In the embodiments of the disclosure, the sequence between the PDCP control PDU and the PDCP data PDU may be that: the PDCP control PDU is located before the PDCP data PDU; or the PDCP control PDL is located after the PDCP data PDU.

In the embodiments of the disclosure, after receiving the PDCP control PDU and the PDCP data. PDU, the DU decodes the PDCP control PDU to obtain the first indication information from the PDCP control PDU, and processes the PDCP data PDU by the RLC layer, the MAC layer and the PHY layer to obtain the MBMS service data; and the DU sends the MBMS service data at the location of the radio resource indicated by the first indication information.

In an optional implementation, the first indication information is used for indicating at least one of the following:
an index of the MBMS radio resource;
a symbol set in the MBMS radio resource;
a time slot set in the MBMS radio resource;
a time domain resource of the MBMS radio resource; and
a frequency domain resource of the MBMS radio resource.

Herein, the index of the MBMS radio resource is used for determining an MBMS radio resource for transmitting the MBMS service; a symbol set in the MBMS radio resource is used for determining the symbol se for transmitting the MBMS service in the MBMS radio resource; and a time slot set in the MBMS radio resource is used for determining the time slot set for transmitting the MBMS service in the MBMS radio resource.

Through the above technical solution, the resource indication information is carried in the PDCP control PDU, so as to achieve the synchronously content transmissions between the adjacent cells.

Second Manner

The first indication information is used for indicating the location of the radio resource for the PDCP data PDU, and the PDCP data PDU is used for carrying the MBMS service data.

Based on this, the first indication information is carried in the header of the PDCP data PDU.

In the embodiments of the disclosure, after receiving the PDCP data PDU, the DU obtains the first indication information from the PDCP data PDU, and removes the first indication information in the PDCP data PDU to obtain a new PDCP data PDU, and processes the new PDCP data PDU by the RLC layer, the MAC layer and the PHY layer to obtain the MBMS service data. The DU sends the MBMS service data at the location of the radio resource indicated by the first indication information.

In an optional implementation, the first indication information is used for indicating at least one of the following:
the index of the MBMS radio resource;
the symbol set in the MBMS radio resource;
the time slot set in the MBMS radio resource;
the time domain resource of the MBMS radio resource; or
the frequency domain resource of the MBMS radio resource.

Herein, the index of the MBMS radio resource is used for determining an MBMS radio resource for transmitting the MBMS service; a symbol set in the MBMS radio resource is used for determining the symbol set for transmitting the MBMS service in the MBMS radio resource; and a time slot set in the MBMS radio resource is used for determining the time slot set for transmitting the MBMS service in the MBMS radio resource.

Through the above technical solution, the resource indication information (i.e. the first indication information) is carried in the header of the PDCP data PDU, so as to achieve the synchronous transmission of contents between the adjacent cells.

Third Manner

The first indication information is used for indicating the location of the radio resource for the PDCP data PDU, and the PDCP data PDU is used for carrying the MBMS service data.

Herein, considering that the PDCP data PDU sent from the CU to the DU is sent in the GTP tunnel, based on this, the first indication information is carried in the header of a GTP packet, the GTP packet carries the PDCP data PDU.

In the embodiments of the disclosure, after receiving the GTP packet through the GTP tunnel, the DU obtains the first indication information and the PDCP data PDU from the GTP packet, and processes the PDCP data PDU by the RLC layer, the MAC layer and the PHY layer to obtain the MBMS service data. The DU sends the MBMS service data at the location of the radio resource indicated by the first indication information.

In an optional implementation, the first indication information is used for indicating at least one of the following:
the index of the MBMS radio resource;
the symbol set in the MBMS radio resource;
the time slot set in the MBMS radio resource;
the time domain resource of the MBMS radio resource; or
the frequency domain resource of the MBMS radio resource.

Here, the index of the MBMS radio resource is used for determining an MBMS radio resource for transmitting the MBMS service; a symbol set in the MBMS radio resource is used for determining the symbol set for transmitting the MBMS service in the MBMS radio resource; and a time slot set in the MBMS radio resource is used for determining the time slot set for transmitting the MBMS service in the MBMS radio resource.

Through the above technical solution, the resource indication information (i.e. the first indication information) is carried in the header of the GTP packet, so as to achieve the synchronous transmission of contents between the adjacent cells.

Fourth Manner

The first indication information is used for indicating a start resource location of the MBMS service data.

Herein, in advance, the DU receives first configuration information from the CU, the first configuration information is used for determining the locations of multiple MBMS resources periodically distributed in a time domain and/or frequency domain. It should be understood that the first configuration information is the pre-configured radio resource (such as configured grant or pre-configured grant) for the MBMS service. Based on this, the start resource location indicated by the first indication information is the location of a first MBMS resource of the multiple MBMS resources.

In the embodiments of the disclosure, after receiving the first indication information, the DU sends the first MBMS service data on the first MBMS resource, and maps subsequent MBMS service data to MBMS radio resources following the first MBMS resource in a pre-defined order.

Herein, the subsequent MBMS service data refers to the MBMS service data after the first MBMS service data.

In an optional implementation, the subsequent MBMS service data is mapped, firstly in frequency domain and then in time domain, to the MBMS radio resources following the first MBMS resource. Or, in another optional implementation, the subsequent MBMS service data is mapped, firstly in time domain and then in frequency domain, to the MBMS radio resources following the first MBMS resource.

In an optional implementation, the first indication information is used for indicating at least one of the following:
the index of the MBMS radio resource;
the symbol set in the MBMS radio resource;
the time slot set in the MBMS radio resource;
the time domain resource of the MBMS radio resource; or
the frequency domain resource of the MBMS radio resource.

Herein, the index of the MBMS radio resource is used for determining an MBMS radio resource for transmitting the MBMS service; a symbol se in the MBMS radio resource is used for determining the symbol set for transmitting the MBMS service in the MBMS radio resource; and a time slot set in the MBMS radio resource is used for determining the time slot set for transmitting the MBMS service in the MBMS radio resource.

Further, in an optional implementation, the CU sends second indication information to all or part of the at least one DU. For one of the at least one DU, the DU receives the second indication information from the CU, the second indication information is used for indicating to stop sending the MBMS service data; and the DU stops sending the MBMS service data on the MBMS radio resource.

Optionally, the first indication information in the above solution may be carried in the PDCP control PDU or an F1 Application Protocol (F1AP) message. Herein, the F1AP messages is a signaling message between the CU and the DU.

Optionally, the second indication information in the above solution may be carried in the PDCP control PDU or the HAP message. Herein, the F1AP messages is a signaling message between the CU and the DU.

Through the above technical solution, the start resource location (i.e. the start position of the MBMS radio resource) of the MBMS service data is indicated through the first indication information, thereby achieving the synchronously content transmissions between the adjacent cells.

In the technical solutions of the embodiments of the disclosure, multiple DUs receive the first indication information from the CU, and send the same MBMS service data at the location of the radio resource indicated by the first indication information, thereby achieving the content synchronization between the adjacent cells.

Figure 11:
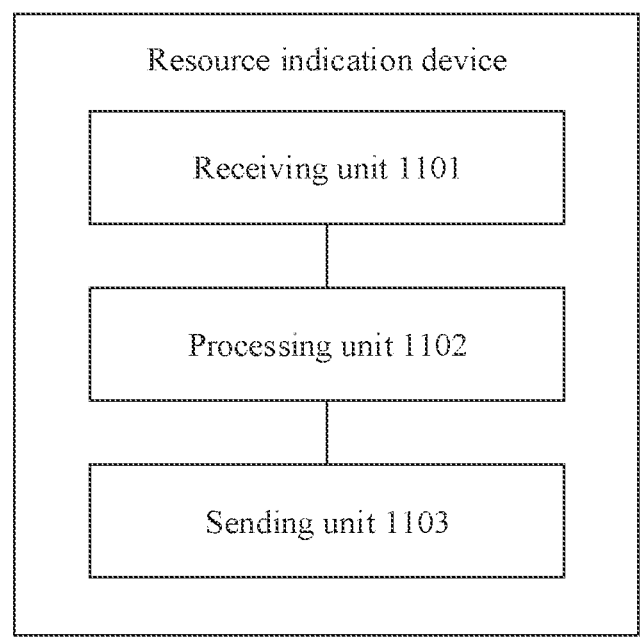
FIG. 11 is a first structural schematic diagram of a resource indication device according to an embodiment of the disclosure.

FIG. 11 is a first structural schematic diagram of a resource indication device according to an embodiment of the disclosure, which is applied to the DU. As illustrated in FIG. 11, the resource indication device includes a receiving unit 1101.

The receiving unit 1101 is configured to receive the first indication information from the CU, and the first indication information is used for indicating the location of the radio resource for the MBMS service data.

In an optional implementation, the first indication information is used for indicating the location of the radio resource for the PDCP data PDU, and the PDCP data PDU is used for carrying the MBMS service data.

In an optional implementation, the first indication information is carried in the PDCP control PDU, and the PDCP control PDU and the PDCP data PDU are sent together to the DU by the CU.

In an optional implementation, the PDCP control PDU is located before the PDCP data PDU; or
the PDCP control PDU is located after the PDCP data PDU.

In an optional implementation, the device may also include a processing unit 1102 and a sending unit 1103.

The processing unit 1102 is configured to obtain the first indication information from the PDCP control PDU, and process the PDCP data PDU by the RLC layer, the MAC layer and the PHY layer to obtain the MBMS service data.

The sending unit 1103 is configured to send the MBMS service data at the location of the radio resource indicated by the first indication information.

In an optional implementation, the first indication information is carried in the header of the PDCP data PDU.

In an optional implementation, the device may also include a processing unit 1102 and a sending unit 1103.

The processing unit 1102 is configured to obtain the first indication information from the PDCP data PDU, remove the first indication information in the PDCP data PDU to obtain a new PDCP data PDU, and process the new PDCP data. PDU by the RLC layer, the MAC layer and the PHY layer to obtain the MBMS service data.

The sending unit 1103 is configured to send the MBMS service data at the location of the radio resource indicated by the first indication information.

In an optional implementation, the first indication information is carried in the header of the GTP packet, and the GTP packet carries the PDCP data PDU.

In an optional implementation, the device may also include a processing unit 1102 and a sending unit 1103.

The processing unit 1102 is configured to obtain the first indication information and the PDCP data PDU from the GTP packet, and process the PDCP data PDU by the RLC layer, the MAC layer and the PHY layer to obtain the MBMS service data.

The sending unit 1103 is configured to send the MBMS service data at the location of the radio resource indicated by the first indication information.

In an optional implementation, the first indication information is used for indicating the start resource location of the MBMS service data.

In an optional implementation, the receiving unit 1101 is further configured to receive the first configuration information from the CU, the first configuration information is used for determining the locations of multiple MBMS resources periodically distributed in the time domain and/or frequency domain.

The start resource location indicated by the first indication information is the location of the first MBMS resource of the multiple MBMS resources.

In an optional implementation, the device may also include a sending unit 1103.

The sending unit 1103 is configured to send the first MBMS service data on the first MBMS resource, and map the subsequent MBMS service data to the MBMS radio resources following the first MBMS resource in a predefined order.

In an optional implementation, the subsequent MBMS service data is mapped, firstly in frequency domain and then in time domain, to the MBMS radio resources following the first MBMS resource.

The subsequent MBMS service data is mapped, firstly in time domain and then in frequency domain, to the MBMS radio resources following the first MBMS resource.

In an optional implementation, the receiving unit 1101 is further configured to receive the second indication information from the CU, the second indication information being used for indicating to stop sending the MBMS service data.

The sending unit 1103 is further configured to stop sending the MBMS service data on the MBMS radio resource.

In an optional implementation, the first indication information is carried in the PDCP control PDU or the F1AP message.

In an optional implementation, the first indication information is used for indicating at least one of the following:
the index of the MBMS radio resource;
the symbol set in the MBMS radio resource;
the time slot set in the MBMS radio resource;
the time domain resource of the MBMS radio resource; or
the frequency domain resource of the MBMS radio resource.

It should be understood by those skilled in the art that the related descriptions about the resource indication device of the embodiments of the disclosure may be understood with reference to the related descriptions about the resource indication method of the embodiments of the disclosure.

Figure 12:
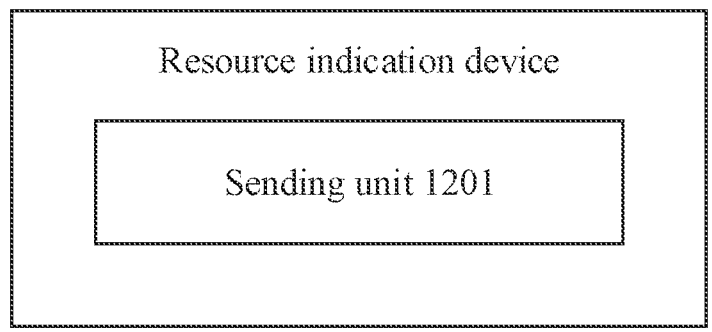
FIG. 12 is a second structural schematic diagram of a resource indication device according to an embodiment of the disclosure.

FIG. 12 is a second structural schematic diagram of a resource indication device according to an embodiment of the disclosure, which is applied to the CU. As illustrated in FIG. 12, the resource indication device includes: a sending unit 1201.

The sending unit 1201 is configured to send the first indication information to at least one DU, and the first indication information is used for indicating the location of the radio resource for the MBMS service data.

In an optional implementation, the first indication information is used for indicating the location of the radio resource for the PDCP data PDU, and the PDCP data PDU is used for carrying the MBMS service data.

In an optional implementation, the first indication information is carried in the PDCP control PDU, and the PDCP control PDU and the PDCP data PDU are sent together to the at least one DU by the CU.

In an optional implementation, the PDCP control PDU is located before the PDCP data PDU; or,
the PDCP control PDU is located after the PDCP data PDU.

In an optional implementation, the first indication information is carried in the header of the PDCP data PDU.

In an optional implementation, the first indication information is carried in the header of the GTP packet, and the GTP packet carries the PDCP data PDU.

In an optional implementation, the first indication information is used for indicating the start resource location of the MBMS service data.

In an optional implementation, the sending unit 1201 is further configured to send the second indication information to all or part of the at least one DU, the second indication information is used for indicating to stop sending the MBMS service data.

In an optional implementation, the first indication information is carried in the PDCP control PDU or the F1AP message.

In an optional implementation, the first indication information is used for indicating at least one of the following:
the index of the MBMS radio resource;
the symbol set in the MBMS radio resource;
the time slot set in the MBMS radio resource;
the time domain resource of the MBMS radio resource; or
the frequency domain resource of the MBMS radio resource.

It should be understood by those skilled in the art that the related descriptions about the resource indication device of the embodiments of the disclosure may be understood with reference to the related descriptions about the resource indication method of the embodiments of the disclosure.

Figure 13:
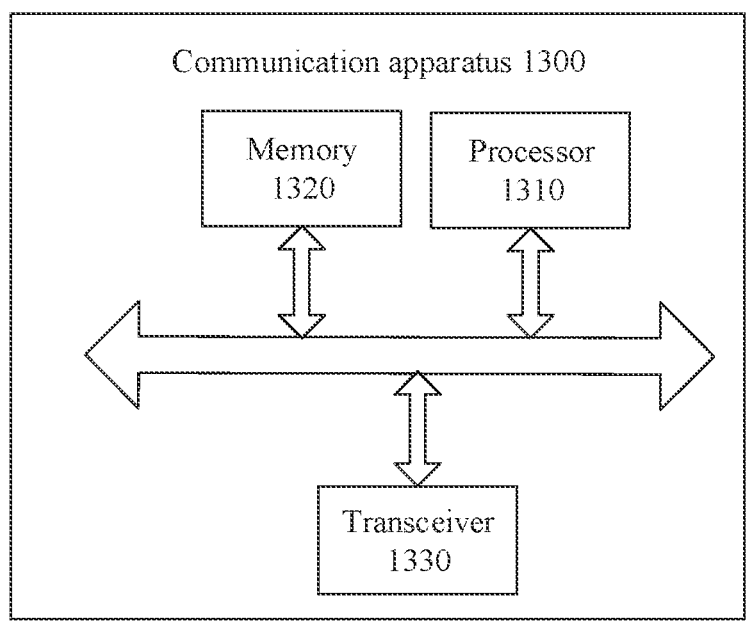
FIG. 13 is a schematic structure diagram of a communication apparatus according to an embodiment of the disclosure.

FIG. 13 is a schematic structure diagram of a communication apparatus 1300 according to an embodiment of the disclosure. The communication apparatus may be a network device, for example, a base station which may adopt an architecture where the CU and the DU are separated. The communication apparatus 1300 illustrated in FIG. 13 includes a processor 1310, and the processor 1310 may call and run a computer program in a memory to implement the method in the embodiments of the disclosure.

Optionally, as illustrated in FIG. 13, the communication apparatus 1300 may further include the memory 1320. The processor 1310 may call and run the computer program in the memory 1320 to implement the method in the embodiments of the disclosure.

The memory 1320 may be a separate device independent of the processor 1310, and may also be integrated in the processor 1310.

Optionally, as illustrated in FIG. 13, the communication apparatus 1300 may further include a transceiver 1330, and the processor 1310 may control the transceiver 1330 to communicate with another device, specifically sending information or data to the other device or receiving information or data from the other device.

The transceiver 1330 may include a transmitter and a receiver. The transceiver 1330 may further include an antenna. The number of the antenna may be one or more.

Optionally, the communication apparatus 1300 may specifically be the network device of the embodiments of the disclosure, and the communication apparatus 1300 may implement corresponding flows implemented by the network device in each method of the embodiments of the disclosure. For simplicity, elaborations are omitted herein.

Optionally, the communication apparatus 1300 may specifically be the mobile terminal/terminal device of the embodiments of the disclosure, and the communication apparatus 1300 may implement corresponding flows implemented by the mobile terminal/terminal device in each method of the embodiments of the disclosure. For simplicity, elaborations are omitted herein.

Figure 14:
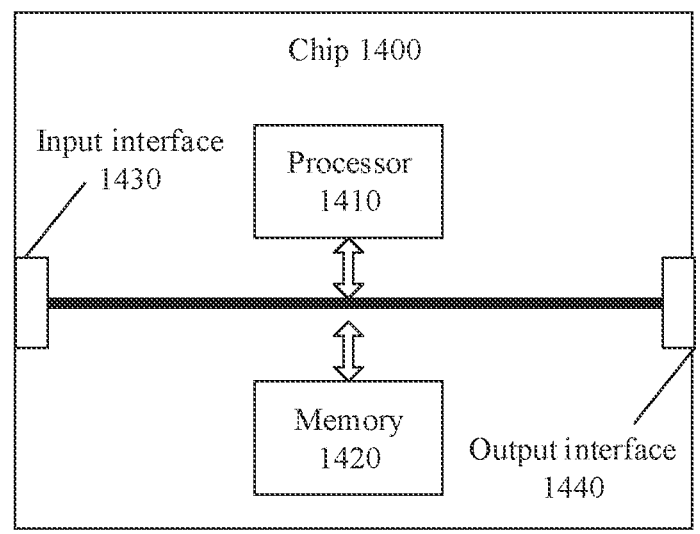
FIG. 14 is a schematic structure diagram of chip according to an embodiment of the disclosure.

FIG. 14 is a schematic structure diagram of a chip according to an embodiment of the disclosure. The chip 1400 illustrated in FIG. 14 includes a processor 1410, and the processor 1410 may call and run a computer program in a memory to implement the method in the embodiments of the disclosure.

Optionally, as illustrated in FIG. 14, the chip 1400 may further include the memory 1420. The processor 1410 may call and run the computer program in the memory 1420 to implement the method in the embodiments of the disclosure.

The memory 1420 may be a separate device independent of the processor 1410, and may also be integrated in the processor 1410.

Optionally, the chip 1400 may further include an input interface 1430. The processor 1410 may control the input interface 1430 to communicate with other devices or chips; specifically, the input interface may acquire information or data sent by other devices or chips.

Optionally, the chip 1400 may further include an output interface 1440. The processor 1410 may control the output interface 1440 to communicate with other devices or chips; specifically, the output interface may output information or data to other devices or chips.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal device of the embodiment of the disclosure, and the chip may implement corresponding flows implemented by the mobile terminal/terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 15:
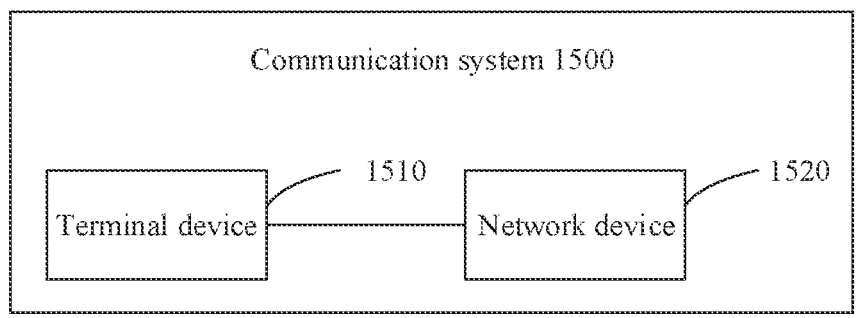
FIG. 15 is a schematic block diagram of a communication system according to an embodiment of the disclosure.

FIG. 15 is a schematic block diagram of a communication system 1500 according to an embodiment of the disclosure. As illustrated in FIG. 15, the communication system 1500 includes the terminal device 1510 and the network device 1520.

The terminal device 1510 may be configured to realize corresponding functions realized by the terminal device in the above method, and the network device 1520 may be configured to realize corresponding functions realized by the network device in the above method. For simplicity, elaborations are omitted herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The above processor may be a general-purpose processor, a Digital Signal Processor (DSP), an Application Specific Integrated Circuit (ASIC), a Field Programmable Gate Array (FPGA) or other programmable logical device, discrete gate or transistor logical device and discrete hardware component. Each method, operation and logical block diagram disclosed in the embodiments of the disclosure may be implemented or executed. The general-purpose processor may be a microprocessor, or the general-purpose processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memories above mentioned are exemplarily but unlimitedly described; for example, the memories in the embodiments of the present disclosure may also be an SRAM, a DRAM, a SDRAM, a DDR SDRAM, an ESDRAM, a SLDRAM and a DR RAM). That is, the memories in the embodiments of the present disclosure are intended to include, but not limited to, memories of these and any other proper types.

The embodiments of the disclosure also provide a computer-readable storage medium, which is arranged to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and when the computer program runs in a computer, the computer executes corresponding flows implemented by the network device in each method of the embodiments of the disclosure. For simplicity, elaborations are omitted herein.

Optionally, the computer program may be applied to a mobile terminal/terminal device in the embodiments of the disclosure, and when the computer program runs in the computer, the computer executes corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the present disclosure max be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in the other manners. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separated, and parts displayed as units may or may not be physical units, may be located in one position, or may be distributed on multiple network units. Some or all of the units may be selected to achieve the objectives of the solutions of the embodiments according to actual requirement.

In addition, each functional unit in each embodiment of the disclosure may be integrated into a processing unit, may physically exist independently, or two or more units may be integrated into one unit.

If implemented in form of software functional units and sold or used as an independent product, the functions may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the disclosure. The abovementioned storage medium includes: various media capable of storing program codes, such as a universal serial bus (USB) flash disk, a mobile hard disk, a ROM, a RAM, a magnetic disk or an optical disk.

The above descriptions are only the specific implementation manner of the present disclosure, but are not intended to limit the protection scope of the present disclosure. Any variations or replacements apparent to those skilled in the art within the technical scope disclosed in the present disclosure shall fall within the protection scope of the present disclosure. Therefore, the protection scope of the disclosure shall be subject to the protection scope of the claims.

The invention claimed is:

1. A method for a resource indication, comprising:
   receiving, by a Distributed Unit (DU), first indication information from a Centralized Unit (CU), the first indication information being used for indicating a location of a radio resource for Multimedia Broadcast Multicast Service (MBMS) service data, wherein the first indication information is specifically used for indicating a start resource location of the MBMS service data; and the method further comprises:
   receiving, by the DU, first configuration information from the CU, the first configuration information being used for determining locations of a plurality of MBMS resources periodically distributed in at least one of a time domain or a frequency domain;
   the start resource location indicated by the first indication information is a location of a first MBMS resource of the plurality of MBMS resources.

2. The method of claim 1, wherein a Packet Data Convergence Protocol (PDCP) data Packet Data Unit (PDU) is used for carrying the MBMS service data.

3. The method of claim 2, wherein the first indication information is carried in a PDCP control PDU, and the PDCP control PDU and the PDCP data PDU are sent together to the DU by the CU;
   the PDCP control PDU is located before the PDCP data PDU; or
   the PDCP control PDU is located after the PDCP data PDU.

4. The method of claim 3, further comprising:
   after receiving the PDCP control PDU and the PDCP data PDU, obtaining, by the DU, the first indication information from the PDCP control PDU, and processing the PDCP data PDU by a Radio Link Control (RLC) layer, a Media Access Control (MAC) layer and a Physical (PHY) layer to obtain the MBMS service data; and
   sending, by the DU, the MBMS service data at the location of the radio resource indicated by the first indication information.

5. The method of claim 2, wherein the first indication information is carried in a header of the PDCP data PDU;
   wherein the method further comprises:
   after receiving the PDCP data PDU, obtaining, by the DU, the first indication information from the PDCP data PDU, and removing the first indication information in the PDCP data PDU to obtain a new PDCP data PDU, and processing the new PDCP data PDU by a Radio Link Control (RLC) layer, a Media Access Control (MAC) layer and a Physical (PHY) layer to obtain the MBMS service data; and
   sending, by the DU, the MBMS service data at the location of the radio resource indicated by the first indication information.

6. The method of claim 2, wherein the first indication information is carried in a header of a General Packet Radio Service (GPRS) Tunneling Protocol (GTP) packet, and the GTP packet carries the PDCP data PDU;
   wherein the method further comprises:
   after receiving the GTP packet, obtaining, by the DU, the first indication information and the PDCP data PDU from the GTP packet, and processing the PDCP data PDU by a Radio Link Control (RLC) layer, a Media Access Control (MAC) layer and a Physical (PHY) layer to obtain the MBMS service data; and
   sending, by the DU, the MBMS service data at the location of the radio resource indicated by the first indication information.

7. The method of claim 1, further comprising:
   after receiving the first indication information, sending, by the DU, first MBMS service data on the first MBMS resource, and mapping subsequent MBMS service data to MBMS radio resources following the first MBMS resource in a pre-defined order;
   wherein the subsequent MBMS service data is mapped, firstly in frequency domain and then in time domain, to the MBMS radio resources following the first MBMS resource; or
   the subsequent MBMS service data is mapped, firstly in time domain and then in frequency domain, to the MBMS radio resources following the first MBMS resource.

8. The method of claim 1, further comprising:
receiving, by the DU, second indication information from the CU, the second indication information being used for indicating to stop sending the MBMS service data; and
stopping, by the DU, sending the MBMS service data on a MBMS radio resource.

9. The method of claim 1, wherein the first indication information is carried in a Packet Data Convergence Protocol (PDCP) control Packet Data Unit (PDU) or an F1 Application Protocol (F1AP) message.

10. The method of claim 1, wherein the first indication information is used for indicating at least one of:
an index of the first MBMS resource;
a symbol set in the first MBMS resource;
a time slot set in the first MBMS resource;
a time domain resource of the first MBMS resource; or
a frequency domain resource of the first MBMS resource.

11. A method for a resource indication, comprising:
sending, by a Centralized Unit (CU), first indication information to at least one Distributed Unit (DU), the first indication information being used for indicating a location of a radio resource for Multimedia Broadcast Multicast Service (MBMS) service data, wherein the first indication information is specifically used for indicating a start resource location of the MBMS service data;
wherein the method further comprises:
sending, by the CU, second indication information to all or part of the at least one DU, the second indication information being used for indicating to stop sending the MBMS service data.

12. The method of claim 11, wherein a Packet Data Convergence Protocol (PDCP) data Protocol Data Unit (PDU) is used for carrying the MBMS service data.

13. The method of claim 12, wherein the first indication information is carried in a PDCP control PDU, and the PDCP control PDU and the PDCP data PDU are sent together to the at least one DU by the CU;
wherein the PDCP control PDU is located before the PDCP data PDU; or
the PDCP control PDU is located after the PDCP data PDU.

14. The method of claim 12, wherein the first indication information is carried in a header of the PDCP data PDU; or
wherein the first indication information is carried in a header of a General Packet Radio Service (GPRS) Tunneling Protocol (GTP) packet, and the GTP packet carries the PDCP data PDU; or
wherein the first indication information is carried in a Packet Data Convergence Protocol (PDCP) control Protocol Data Unit (PDU) or an F1 Application Protocol (F1AP) message.

15. A device for a resource indication, applied to a Distributed Unit (DU), comprising:
a transceiver, configured to receive first indication information from a Centralized Unit (CU), the first indication information being used for indicating a location of a radio resource for Multimedia Broadcast Multicast Service (MBMS) service data, wherein the first indication information is specifically used for indicating a start resource location of the MBMS service data; and
the transceiver is further configured to receive first configuration information from the CU, the first configuration information being used for determining locations of a plurality of MBMS resources periodically distributed in at least one of a time domain or a frequency domain;
the start resource location indicated by the first indication information is a location of a first MBMS resource of the plurality of MBMS resources.

16. The device of claim 15, wherein a Packet Data Convergence Protocol (PDCP) data Packet Data Unit (PDU) is used for carrying the MBMS service data.

17. The device of claim 16, wherein the first indication information is carried in a PDCP control PDU, and the PDCP control PDU and the PDCP data PDU are sent together to the DU by the CU;
the PDCP control PDU is located before the PDCP data PDU; or
the PDCP control PDU is located after the PDCP data PDU.

18. The device of claim 17, further comprising:
a processor, configured to obtain the first indication information from the PDCP control PDU, and process the PDCP data PDU by a Radio Link Control (RLC) layer, a Media Access Control (MAC) layer and a Physical (PHY) layer to obtain the MBMS service data; and
wherein the transceiver is configured to send the MBMS service data at the location of the radio resource indicated by the first indication information.

* * * * *